United States Patent [19]
Ehlers

[11] Patent Number: 4,727,598
[45] Date of Patent: Feb. 23, 1988

[54] SELECTIVELY MOUNTABLE TV RECEIVER CABINET AND ANTENNA

[75] Inventor: Raymond G. Ehlers, Chesapeake, Va.

[73] Assignee: General Electric Company, Portsmouth, Va.

[21] Appl. No.: 755,114

[22] Filed: Jul. 15, 1985

[51] Int. Cl.$^4$ .................. H04B 1/08; H01Q 1/24; H04N 5/64

[52] U.S. Cl. ..................... 455/347; 343/702; 343/805; 358/254; 312/7.1; 312/7.2; 312/245; D14/77

[58] Field of Search .............. 343/702, 793, 794, 795, 343/802, 805, 813, 814, 878, 880, 906; 455/347, 349, 350; 312/7.1, 7.2, 245, 246; 358/254; D14/77, 79, 84

[56] References Cited

U.S. PATENT DOCUMENTS

| | | | |
|---|---|---|---|
| D. 155,462 | 10/1949 | Trad | D14/84 |
| 1,651,953 | 12/1927 | Hayden | 455/347 X |
| 1,677,589 | 7/1928 | Hallberg | 343/702 |
| 2,050,044 | 8/1936 | D'Onofrio | 312/7.1 |
| 2,128,561 | 8/1938 | Peeck et al. | 455/347 |
| 2,237,260 | 4/1941 | McDonald, Jr. | 455/272 |
| 2,307,805 | 1/1943 | Schnell | 343/878 X |
| 2,315,315 | 3/1943 | Cairnes | 343/702 |
| 2,467,314 | 4/1949 | Johnson | 455/347 X |
| 2,565,661 | 8/1951 | Lidz | 343/702 |
| 2,582,159 | 1/1952 | Race | 343/805 |
| 2,810,909 | 10/1957 | Finkel | 343/805 |
| 3,072,738 | 1/1963 | Epp, Jr. et al. | 358/254 |
| 3,143,331 | 8/1964 | Corey | 343/702 U X |
| 3,327,310 | 6/1967 | Bethune et al. | 343/702 |
| 3,698,780 | 10/1972 | Collins et al. | 312/245 |
| 4,024,542 | 5/1977 | Ikawa et al. | 343/702 |
| 4,037,229 | 7/1977 | Dunk | 343/715 |
| 4,066,967 | 1/1978 | Spina | 312/7.1 X |

OTHER PUBLICATIONS

"Best" Consumer Products Catalog; 1985 Edition; p. 356; Item 11 shows Portable TV suspended under Kitchen Cabinet.

Primary Examiner—Eugene R. LaRoche
Assistant Examiner—Benny T. Leo
Attorney, Agent, or Firm—Carlos Nieves; Paul J. Rasmussen; Peter M. Emanuel

[57] ABSTRACT

A cabinet and antenna assembly for a television set includes an antenna which is selectively mountable at different locations on a cabinet to accommodate different signal receiving environments. When the cabinet is sitting on a lower support, the antenna is mounted at one location on the cabinet to accommodate the antenna in a position extending upward above a cabinet top surface. When the cabinet is suspended under an upper support, the antenna is mounted at a different location on the cabinet to accommodate the antenna in a position extending downward below a cabinet bottom surface.

6 Claims, 4 Drawing Figures

SELECTIVELY MOUNTABLE TV RECEIVER CABINET AND ANTENNA

The present invention relates in general to cabinets for communications receivers and in particular to a cabinet and antenna assembly for a television receiver.

BACKGROUND OF THE INVENTION

In the home environment it is desirable to be able to selectively mount appliances under cabinets or shelves. It has become commonplace, for example, to mount kitchen appliances such as can openers and microwave ovens under kitchen cupboards so as to leave counter space free for other uses. With the decreasing size and hence increasing portability of television receivers, it is becoming increasingly common to move a single portable television between many rooms. Accordingly it would be convenient, for example in the kitchen, to be able to mount a television under a cupboard so that it is supported for viewing without requiring the use of counter space.

When suspending television receivers under upper supports such as cupboards, however, a problem exists as to how to accommodate the required antenna. A portable television typically includes a generally upwardly extending, telescopic "rabbit ear" antenna fixed to the top or back of its cabinet. When such a television is suspended under an upper support, its antenna is virtually useless because it cannot be fully extended or adjusted for acceptable reception. Further, the antenna may interfere with a secure mounting of the television cabinet beneath the upper support.

OBJECTS OF THE INVENTION

The principal object of the present invention is to provide a new and improved cabinet and antenna assembly for a communications receiver which is not subject to the aforementioned problems and disadvantages.

Another object of the present invention is to provide a cabinet and antenna assembly for a communications receiver which allows an antenna to be selectively mounted at different locations on a receiver cabinet to enable the combination to fit in available space or to accommodate different signal receiving environments.

A further object of the present invention is to provide a cabinet and antenna assembly for a communications receiver which accommodates the extending and adjustment of an antenna when the communications receiver cabinet is either sitting on a lower support or suspended under an upper support.

Yet another object of the present invention is to provide a cabinet and antenna assembly for a communications receiver which permits an antenna to be selectively mounted at different locations on a cabinet while continuously maintaining an electrical connection between the antenna and the communications receiver through a single transmission line.

Another object of the present invention is to provide a cabinet and antenna assembly for a communications receiver which permits two antennas to be supported by a single base which can be selectively mounted at different locations on a cabinet.

An additional object of the present invention is to provide a cabinet and antenna assembly for a communications receiver which permits two antennas to be connected to the receiver by a single transmission line connected at a common antenna base.

A more specific object of the present invention is to provide a cabinet and antenna assembly for a television receiver which can be suspended under a shelf or cupboard while accommodating the extending, adjustment and electrical connection of both UHF and VHF antennas.

SUMMARY OF THE INVENTION

These and other objects of the invention are achieved through the use of a new and improved cabinet and antenna assembly for a communications receiver, such as a television, which includes an antenna selectively mountable at different locations on the receiver cabinet. This selective mounting permits the antenna to be positioned to accommodate different signal receiving environments.

When the receiver cabinet is sitting, for example, on a lower support such as a table, the antenna is mounted to the cabinet in its traditional location proximate the cabinet top. This position accommodates generally upward extending and adjustment of the antenna. When the receiver cabinet is suspended, for example, under a kitchen cupboard, in accordance with the present invention the antenna is mounted to the cabinet proximate the cabinet bottom. This position accommodates generally downward extending and adjustment of the antenna. A connection is maintained between the antenna and the receiver through a single transmission line of a length sufficient to accommodate both of these antenna mounting positions.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

DETAILED DESCRIPTION OF THE DRAWINGS

Figure 1:
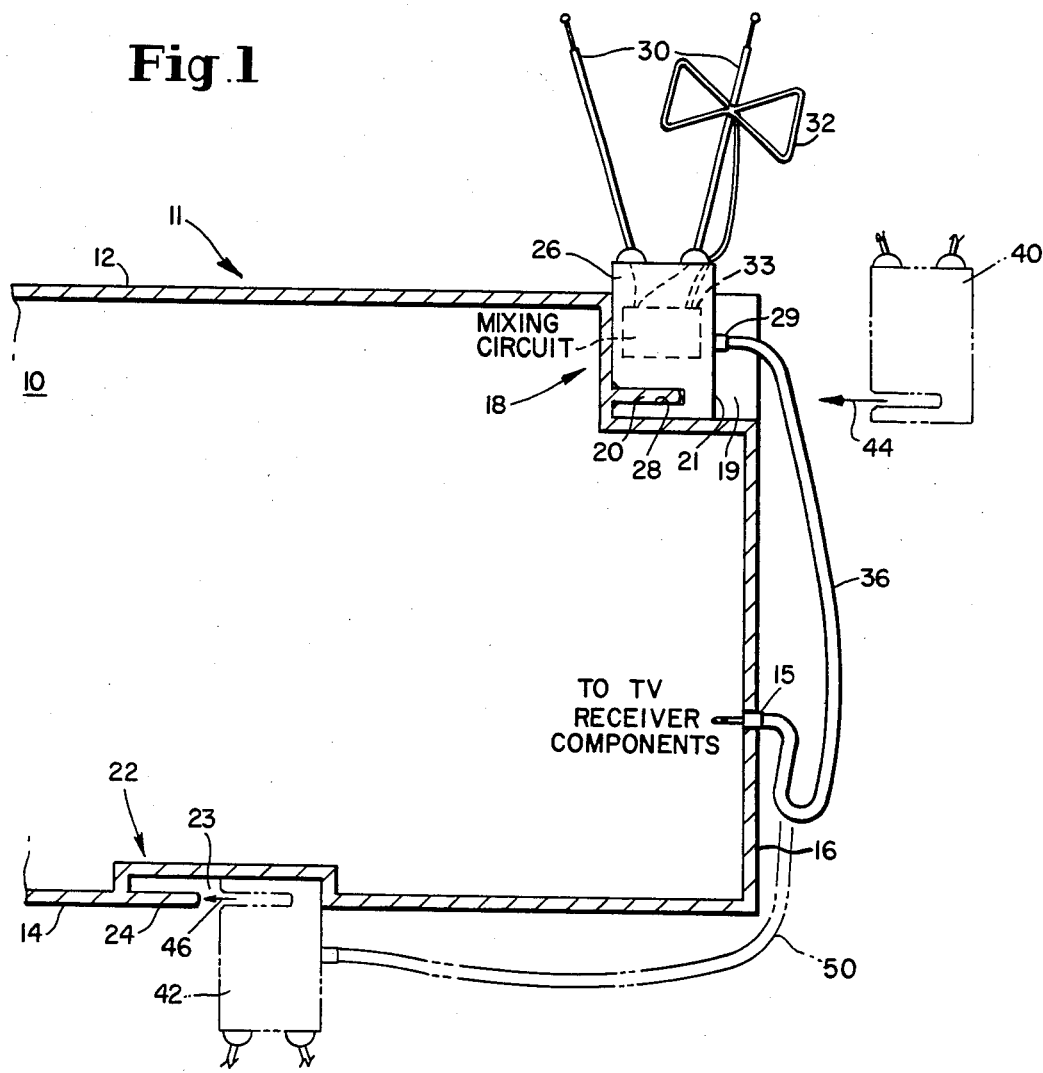
FIG. 1 is a partial, cross-sectional side view of a cabinet and antenna assembly constructed in accordance with a preferred embodiment of the invention.

Referring now to the drawings, FIG. 1 shows a cabinet and antenna assembly 10 including a cabinet 11 having top, bottom and back sides indicated at 12, 14 and 16, respectively. An electrical connector 15 is fixedly positioned on back side 16 of cabinet 11 and electrically connected to appropriate television receiver components (not shown). A mounting facility, generally indicated at 18, is illustrated as being in the form of a recess 19 molded into the top side 12 of cabinet 11 with a tongue 20 projecting into this recess. Another mounting facility, generally indicated at 22, is also in the form of a recess 23 molded into cabinet bottom side 14 with a tongue 24 projecting thereinto. An antenna base 26 supports a VHF antenna 30 and a UHF antenna 32, both illustrated herein as dipoles, with the UHF antenna preferably being clipped to the VHF antenna in the traditional manner shown. Antenna base 26 includes a groove 28 which in FIG. 1 is shown slidingly engaged with tongue 20 of mounting facility 18. An electrical connector 29 is fixedly positioned on a back surface 21 of antenna base 26.

Internally housed in antenna base 26 is a mixing circuit 33 connected between UHF and VHF antennas 30 and 32, respectively, and electrical connector 29 by appropriate wiring. Mixing circuit 33 comprises one of the many, commercially available UHF-VHF mixers known in the art and functions to combine the signals received on antennas 30 and 32 and feed them, via connector 29, over a two-conductor transmission line 36 to the input of a television receiver (not shown) housed in cabinet 11. Transmission line 36 preferably comprises a commercially available 300 ohm twinlead or a 75 ohm coaxial cable, the appropriate one of which is selected to match the impedance of the television receiver.

As will be appreciated through a consideration of the two phantom illustrations of antenna base 26, indicated at 40 and 42, antenna base 26 is mounted to cabinet 10 by aligning its groove 28 with a selected tongue 20 (as shown at phantom 40) or 24 (as shown at phantom 42), and slidingly mating the tongue and groove with a horizontal motion along the direction indicated by arrows 44 and 46. Transmission line 36 is selected to be of a sufficient length to maintain its connection between electrical connector 29 and electrical connector 15 when the antenna base is mounted at either of mounting facilities 18 or 22. This is illustrated by the connection of antenna base phantom 42 to connector 15 by a transmission line phantom 50.

Figure 2:
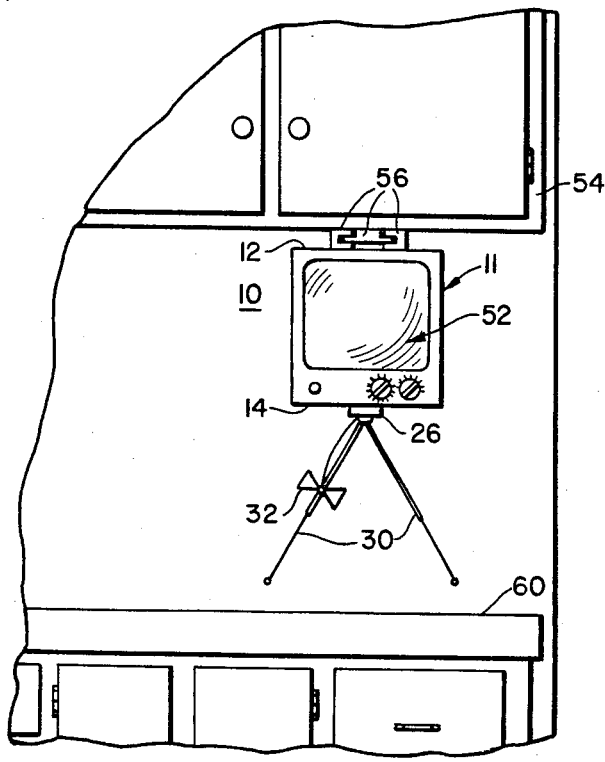
FIG. 2 is a front elevational view of a television receiver housed in the cabinet and antenna assembly of FIG. 1 and suspended under a cupboard.
Figure 3:
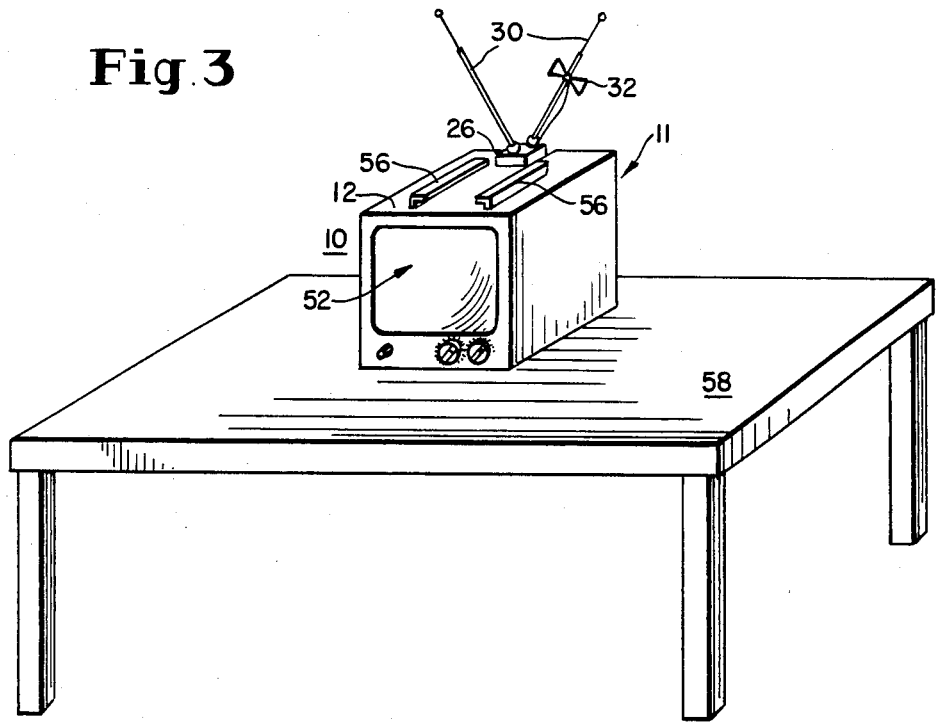
FIG. 3 is a perspective view of the television receiver of FIG. 2 sitting on a table.

FIGS. 2 and 3 show a television receiver 52 housed in cabinet and antenna assembly 10 of FIG. 1. FIG. 2 shows cabinet 10 suspended from an overhanging support, such as a kitchen cupboard 54, by slide mounts 56, while FIG. 3 shows the cabinet sitting on a table 58.

From a consideration of FIGS. 1-3, it will be appreciated that the cabinet and antenna assembly 10 of the present invention allows antennas 30 and 32 to be selectively mounted at different locations on cabinet 11 to accommodate different TV viewing environments. When cabinet 11 is sitting with its flat bottom side 14 supported by table 58, antenna base 26 is mounted by mounting facility 18 in cabinet top side 12. This mounting allows antennas 30 and 32 to extend upward above the cabinet top where there is sufficient room to adjust them for optimum signal reception. When cabinet 11 is suspended under cupboard 54 by slide mounts 56, antenna base 26 is mounted by mounting facility 22 in cabinet bottom side 14. Slide mounts 56, or an equivalent mounting facility, are preferably selected to situate cabinet top side 12 closely adjacent the underside of cupboard 54, thereby providing the maximum amount of space between cabinet bottom side 14 and an underlying counter 60. This selective mounting allows antennas 30 and 32 to extend downward of cabinet 11 into the open space between the cabinet bottom side 14 and the top of counter 60, where there is again sufficient room to adjust them for optimum signal reception, as is shown in FIG. 2.

It will be further appreciated that the inclusion of mixing circuit 33 in antenna base 26 permits both the UHF and VHF antennas to be connected to the television receiver via the single, two-conductor transmission line 36. This use of mixing circuit 33 negates the requirement for separate connections between each antenna and the television receiver which would otherwise be necessary, and thereby eliminates the inherent disadvantages of plural transmission lines and connectors.

Figure 4:
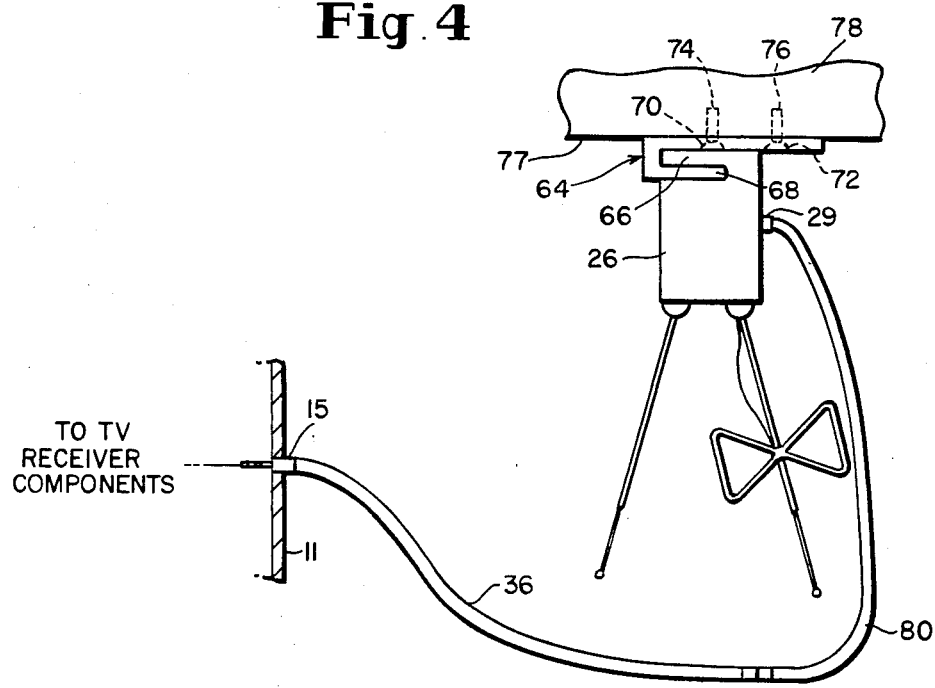
FIG. 4 is a front elevational view of a remote antenna mounting bracket for use with the cabinet and antenna assembly of FIG. 1.

FIG. 4 shows a remote antenna mounting facility in the form of a separate bracket 64 including a recess 66 and tongue 68 similar to those of mounting facilities 18 and 22 of FIG. 1. Bracket 64 includes apertures 70 and 72 through which screws 74 and 76 are inserted to fasten the bracket proximate a surface 77 of a support 78 remote from television receiver cabinet 11 (shown in part). Bracket 64 is optionally used to mount antenna base 26 at selected locations remote from cabinet 11, for example underneath a cupboard from which the cabinet is suspended as shown in FIG. 2. An extension transmission line 80, adapted to mate with transmission line 36 and electrical connector 29, is used to optionally extend the distance between antenna base 26 and cabinet 11 in the manner shown. Bracket 64 and transmission line extension 80 thereby provide a viewer with greater flexibility in selecting a viewing location for receiver cabinet 11 and a mounting location for antenna base 26 where there is more available space to extend and adjust the antennas. Further, this increase in flexibility is obtained while maintaining the convenient, single transmission line connection between the antenna base and cabinet.

While the present invention has been shown and described with reference to a preferred embodiment, it will be understood that numerous modifications, changes, variations, substitutions and equivalents will occur to those skilled in the art without departing from the spirit and scope of the invention. For example, while a tongue and groove joint has been disclosed in the illustrated embodiment for securing antenna base 26 to mounting facilities 18 or 22, it will be obvious to those skilled in the art that other mounting configurations, including separate mounting brackets attached to the cabinet sides, may be utilized in practicing the invention. Moreover, while the mounting facilities are shown incorporated in the cabinet top and bottom sides, it will be understood that they may be incorporated in or attached to cabinet sides adjacent the top and bottom sides to respectively accommodate generally upward and generally downward antenna deployment. Accordingly, it is intended that the invention herein be limited only by the scope of the appended claims.

What is claimed is:

1. A cabinet and antenna assembly for a communications receiver, comprising:
    a cabinet including top and bottom surfaces, said bottom surface configured for sitting on a lower support in one placement of said receiver;
    means situated on said cabinet for suspending said cabinet from an upper support without support from beneath said cabinet so as to position said top surface of said cabinet closely adjacent said upper support in an alternate placement of said receiver;
    a first antenna;
    a base for supporting said first antenna so that said antenna may be angularly adjusted relative to said base;
    first mounting means situated on said cabinet for allowing said base to be mounted on said cabinet to accommodate said first antenna in an angularly adjustable position extending generally upward above said top surface of said cabinet;

second mounting means situated on said cabinet for allowing said base to be mounted on said cabinet to accommodate said first antenna in an angularly adjustable position extending generally downward below said bottom surface of said cabinet;

an electrical connector fixedly positioned on said cabinet and connected to said communications receiver; and a transmission line for connecting said first antenna to said electrical connector, said transmission line being of a sufficient length to maintain its connection when said base is mounted by either one of said first or second mounting means;

whereby said first antenna can be selectively mounted on said cabinet alternately either by said first mounting means to extend generally upward when said cabinet is sitting on said lower support in said one placement or by said second mounting means to extend generally downward when said cabinet is suspended from said upper support in said alternate placement.

2. A cabinet and antenna assembly in accordance with claim 1 and further including:

a second antenna supported by said base; and a mixing circuit housed in said base and connected between said first and second antennas and said transmission line for mixing signals received by said first and second antennas and outputting the mixed signals onto said transmission line.

3. A cabinet and antenna assembly in accordance with claim 2 wherein said communications receiver comprises a television receiver; and said first and second antennas comprise an antenna for receiving VHF signals and an antenna for receiving UHF signals, respectively.

4. A cabinet and antenna assembly in accordance with claim 3 wherein:

said cabinet is substantially rectangular;

said cabinet top and bottom surfaces comprise opposing top and bottom sides of said cabinet;

said first mounting means is positioned adjacent said cabinet top side;

said second mounting means is positioned adjacent said cabinet bottom side;

said antenna for receiving VHF signals comprises a dipole antenna; and said means for suspending said cabinet from an upper support is configured to position said top side of said cabinet closely adjacent said upper support.

5. A cabinet and antenna assembly in accordance with claim 1 and further comprising:

third mounting means for allowing said base to be mounted proximate a selected surface remote from said cabinet.

6. A cabinet and antenna assembly in accordance with claim 3 and further comprising:

third mounting means for allowing said base to be mounted proximate a selected surface remote from said cabinet.

* * * * *